United States Patent [19]

Yvard et al.

[11] 4,323,927

[45] Apr. 6, 1982

[54] BAR FOR PRINTING AN IMAGE

[75] Inventors: Marcel Yvard, Ollainville; Jean-Claude Decuyper, Elancourt; Michel Beduchaud, Villebon Sur Yvette, all of France

[73] Assignee: Compagnie Industrielle des Telecommunications Cit-Alcatel, Paris, France

[21] Appl. No.: 120,517

[22] Filed: Feb. 11, 1980

Related U.S. Application Data

[63] Continuation of Ser. No. 914,177, Jun. 9, 1978, abandoned.

[30] Foreign Application Priority Data

Jun. 13, 1977 [FR] France .................. 77 18011

[51] Int. Cl.³ .............................................. H04N 1/24
[52] U.S. Cl. .................................... 358/296; 358/300; 346/154; 346/155; 346/139 C
[58] Field of Search ...................... 358/296, 300, 301; 346/154, 155, 165, 139 C, 74.5

[56] References Cited

U.S. PATENT DOCUMENTS

| | | | |
|---|---|---|---|
| 3,470,563 | 9/1969 | Starr | 346/139 C |
| 3,551,661 | 12/1970 | Bliss | 235/311 |
| 3,672,043 | 6/1972 | Trimble | 360/125 |
| 3,946,403 | 3/1976 | Ikeuchi | 358/300 |
| 4,030,107 | 6/1977 | Tagawa | 346/139 C |
| 4,052,714 | 10/1977 | Peterson | 346/139 C |
| 4,115,763 | 9/1978 | Brown | 346/154 |

OTHER PUBLICATIONS

Technische Mitterlunger A-Telefunken, vol. 64, No. 6, ©1974 by Sussenbach et al., "Grundlagen eines elektrosensitiven Rasterdruckverfahrens", pp. 193-197.

Primary Examiner—James W. Moffitt
Assistant Examiner—Alan Faber
Attorney, Agent, or Firm—Roland Plottel

[57] ABSTRACT

The invention relates to a bar for printing an image. It comprises a stack of conductive plates which are insulated from one another in which one end of each forms a printing stylus and n diagonal matrices for addressing the styli whose columns are constituted by plates and are fed via resistors formed on the plates and whose rows common to the n matrices are constituted by electric conductors connected to the columns via diodes which are also formed on the plates.

14 Claims, 7 Drawing Figures

BAR FOR PRINTING AN IMAGE

This is a continuation of application Ser. No. 914,177, filed June 9, 1978, now abandoned.

FIELD OF THE INVENTION

The present invention relates to a bar for printing an image on sensitive paper. The printing bar is used in particular in a document reproduction unit of a facsimile transmission installation.

BACKGROUND OF THE INVENTION

In an installation of this type, an analyzed document whose contents are transmitted to the reproduction unit is restored by a printing head or bar which scans a chosen sensitive paper along successive lines. The printing head or bar is energized by a data signal received by the reproduction unit and which defines the contents of the scanned line for printing the successive image dots along the scan line in question.

Image dots, and hence dots of variable density, are formed by causing, by reaction, a localized modification of the paper used so as to obtain a variation of its optical appearance, for example colouring. The paper used at the receiving unit can therefore be e.g. electro-sensitive, electro-catalytic or thermo-sensitive. Since the paper used is, for example, electro-catalytic, an image dot is printed by localized application on the paper of a stylus made of catalytic material chosen as a function of the paper and by passing an electric current between the stylus and the paper; catalysis accompanied by a change in the colour of the paper is thus caused. In this example, the paper can be constituted by an external layer of sensitive material, a conductive sub-layer and a base paper which supports them. The stylus can for example be made of or covered with silver; it presses against the external layer.

A complete image line can be printed by moving a single stylus printing head along a scan line of paper. A complete scan line can also be obtained by a printing bar which has as many printing styli as there are image dots to the line. The printing bar is static in relation to the scan line in question; there will be only a relative step by step movement between the paper and the printing bar. Such a bar may be constituted by a stack of conductive plates which are insulated from each other and each having an end which forms one of the styli.

The present invention aims to constitute a printing bar with a plurality of styli so equipped as to allow each of the styli to be controlled being easy to produce industrially.

SUMMARY OF THE INVENTION

The present invention provides a bar for printing an image on sensitive paper by scanning the paper along successive lines, the bar comprising a stack of thin conductive plates which are isolated from each other and each of which includes a first end that constitutes a printing stylus, the printing styli being disposed along a scan line at the pitch of printing dots therealong, the said bar being characterized in that it comprises n diagonal diode matrices (20) for addressing the styli (10), the columns of the matrices being constituted by respective ones of the plates (1) which are divided into n sets of plates corresponding to the n matrices; the lines of the matrices being common to all n matrices and being constituted by at least one network of electrical conductors (24) disposed at the side(s) of the plates, and that in each of the n matrices (20):

The stylus addressing matrices are therefore integrated in the printing bar at the plates which carry or include the styli.

Other characteristics and advantages of the present invention will become apparent from the description given hereinbelow with reference to diagrams of embodiments given by way of example in the accompanying drawings in which:

DETAILED DESCRIPTION

The printing bar which will be described with reference to the accompanying drawings is intended to form an image on sensitive paper, the image being printed by scanning the paper along successive lines and by printing successive image dots along each line. By way of example, the printing bar forms a part of a facsimile reproduction assembly; it is static from the mechanical point of view; the sensitive paper facing the printing bar and on which the image is formed moves step by step under the action of known drive means for printing successive scan lines of the paper.

By way of example, the printing bar illustrated is described within the scope of a facsimile reproduction assembly which allows an image definition of 1728 dots per scan line of 216 mm paper. The paper chosen is of the electro-catalytic type which generally is very sensitive, i.e. it simply requires little energy to be printed on. For example, it originally has a light appearance; printing is obtained by colouring.

Figure 1:
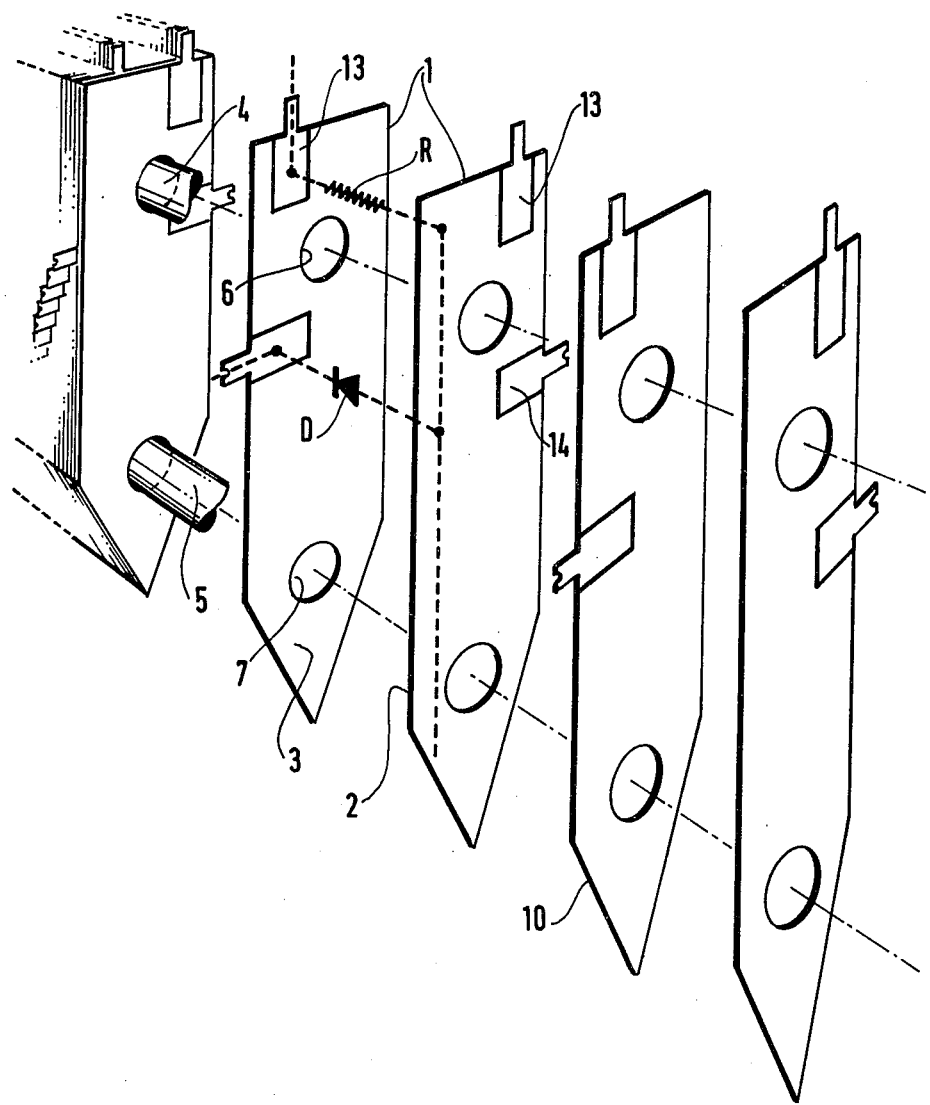
FIG. 1 shows an arrangement of components of a printing bar in accordance with the invention.
Figure 2:
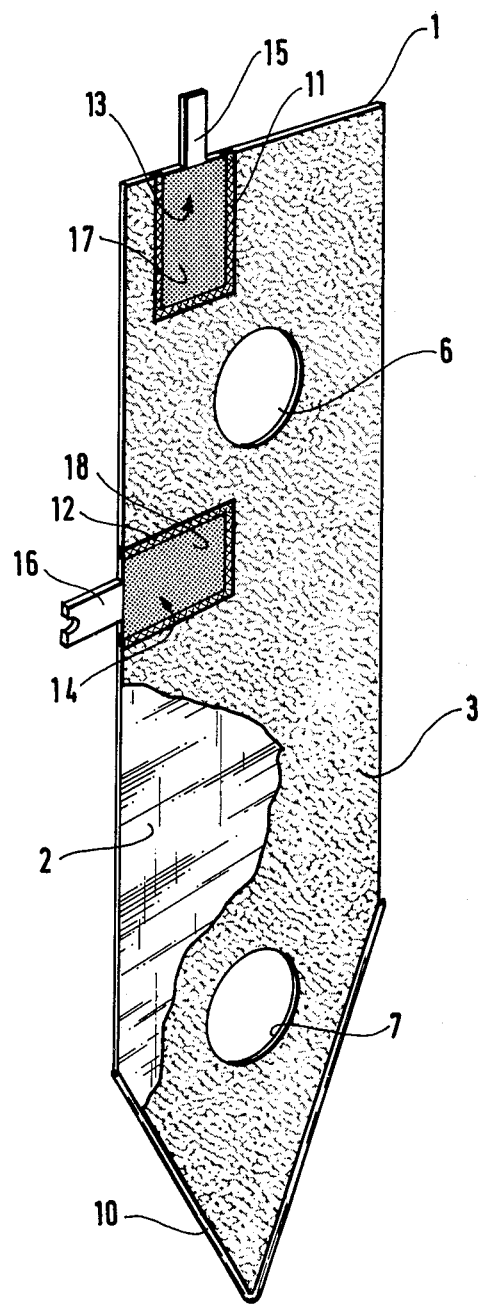
FIG. 2 shows on an enlarged scale one of the components of which the printing bar in accordance with FIG. 1 is made.

An arrangement of the components which constitute such a printing bar are shown schematically in FIG. 1. The printing bar is constituted by plates 1. The plates 1, one of which is shown in FIG. 2, have an electrically conductive surface 2, the other surface 3 is electrically insulative. The plates are advantageously made of a metal which is a good electrical conductor and are covered on one of their surfaces with an insulative deposit or varnish, this surface being the insulative surface 3. One end 10 of each plate is pointed and is covered with a layer of a particular catalyst material, for example silver, to constitute a printing stylus which is also referenced and designated hereinbelow by the reference numeral 10. In one embodiment, the whole plate is made of a material which has catalytic properties.

Figure 3:
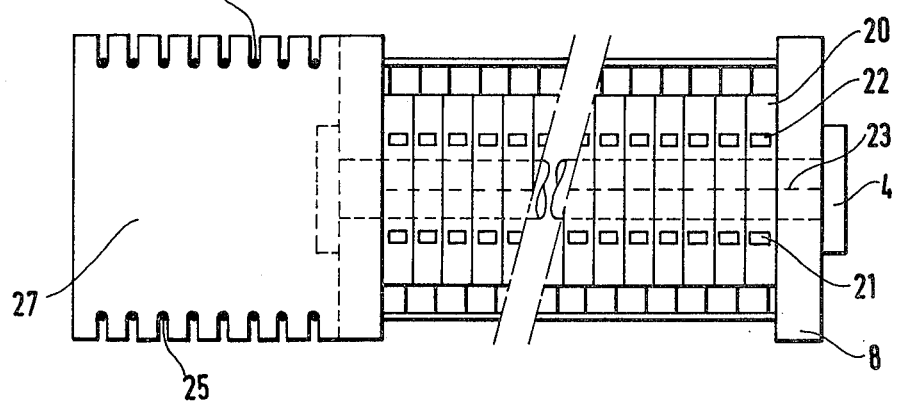
FIG. 3 is a top view of the printing bar whose components are arranged in accordance with the disposition shown in FIG. 1.
Figure 4:
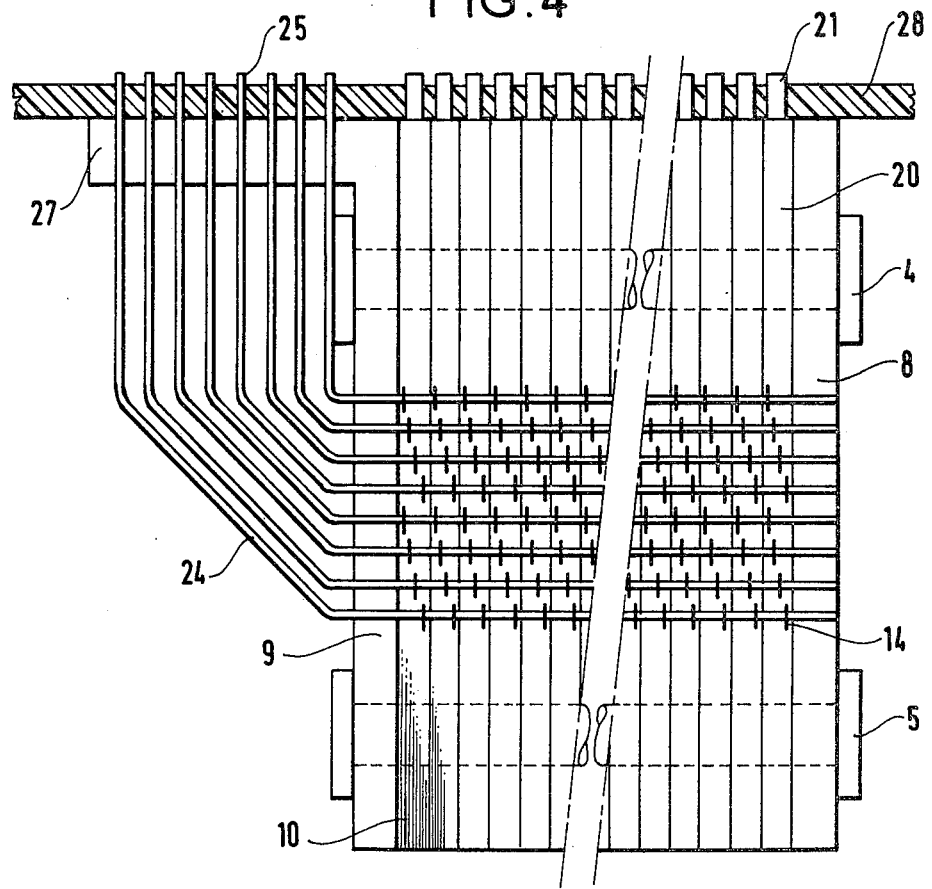
FIG. 4 is a front view of the printing bar whose components are arranged in accordance with the illustration given in FIG. 1.

The printing bar is constituted by a stack of conductive plates 1 which are electrically insulated from each other. This stack, which is shown in FIGS. 3 and 4, is formed on two insulative pins 4 and 5 which pass through two holes 6 and 7 positioned identically in each plate. These pins position the plates between two insulative retaining end plates 8 and 9. The plates 1, thus stacked, extend along the length of each scan line of the paper, i.e. along 216 mm. Once the printing bar is constituted, it can be rectified along a longitudinal generatrix and have, if required, a rounded profile (not shown) at its ends (printing styli 10), so as to form a correct alignment of the printing styli disposed at the pitch of the image dots to be printed along a scan line of the paper.

The printing bar thus constituted includes a stylus addressing circuit. This addressing circuit is integrated in the printing bar at the plates.

With reference in particular to FIG. 1 or 2, it will be seen that each plate 1 has a first cut-out 11 at the opposite end to the point which constitutes the stylus 10 and a second lateral cut-out 12. These cut-outs 11 and 12 are rectangular and are open at the outside of the plate. A first conductive part 13 is inserted in the cut-out 11. A second conductive part 14 is also inserted in the cut-out 12. These two conductive parts 13 and 14 have a generally rectangular shape and have the same thickness as the plates; they are electrically insulated from the plate in which they are inserted, for example by an adhesive, or by an insulative deposit or varnish which covers their edges, as schematically shown. They are held in the plate either by the aforementioned adhesive or by simple assembly of the plates when the printing bar is formed. They both end in a contact tab 15 or 16 which extends beyond the plate which acts as an electrical connection point. These parts 13 and 14 fitted with contact tabs 15 or 16 are called respectively hereinbelow the first contact terminal and the second contact terminal and are designated hereinbelow by the same references 13 and 14.

In the stack of plates 1 which constitutes the printing bar, the first contact terminals 13 are disposed alternately on either side of the longitudinal centre plane of the printing bar, the first contact terminals inserted in two adjacent plates occupying a symmetrical position with respect to this centre plane.

In the stack of plates 1 which constitutes the printing bar, the second contact terminals 14 are disposed alternately on either of the two side surfaces of the plates. The second contact terminals 14 situated on a same side are also staggered in relation to one another, i.e. two second contact terminals 14 which belong to the same side are situated at different levels.

Each of the first contact terminals 13 has a layer of resistive material 17, for example a carbon deposit on its surface situated on the same side as the insulating surface of the plate in which it is inserted. This resistive material is in electric contact firstly with the contact terminal 13 which belongs to the plate in question and secondly with the conductive surface which faces the adjacent plate. An electric resistance R schematically shown in FIG. 1, is thus formed between two adjacent plates. The electric circuit thus formed is schematically shown by broken lines: the conductive surface of a given plate, hence its end stylus, is fed by the first contact terminal 13 of the upstream plate, via the electric resistance R formed between these two plates. It will be observed that the printing bar will therefore comprise in practice 1729 plates, the first plate simply feeding the first printing stylus carried by the second plate of the stack.

Each of the second contact terminals 14 carries a layer or pellet of semiconductive material 18, for example selenium or cadmium sulphide, on the same side as the insulating surface of the plate in which the contact terminal is inserted. This semiconductive pellet 18 is welded, soldered, glued with electrically conductive adhesive or held by pressure on the second contact terminal 14 with which it is therefore in electrical contact; it is also in electrical contact with the conductive surface which faces the adjacent plate. As schematically shown in FIG. 1, a diode D is constituted between two adjacent plates, the said diode conducting, as illustrated, from the conductive surface of one plate to the second contact terminal 14 of the upstream plate. The complete electric circuit, in broken lines, also includes the diode D which makes it possible to short-circuit the end stylus of a plate from the second contact terminal 14 which belongs to the upstream plate.

By way of an example, the insulative deposit which forms the insulative surface 3 of each plate, the resistive deposit and the semiconductive deposit which are formed respectively on the contact terminals 13 and 14 will be about 30µ thick. The insulative deposit will advantageously have some plasticity to allow some interfitting of the shape of the insulative surface of the plates in the stack of plates.

FIGS. 3 and 4 which, with FIGS. 1 and 2, complete the description of the printing bar, show the printing bar constituted by assemblies 20 of stacked plates (FIGS. 1 and 2). In the case illustrated, 108 assemblies 20 each of 16 plates 1 or styli 10 have been constituted from the 1728 plates which carry the 1728 printing styli. These 108 assemblies are identical and extend over 216 mm.

At each assembly 20, two contact pins 21 and 22 on either side of the centre plane of the printing bar (which is indicated by the broken line 23), each group together the tabs of the eight conductive parts 13, hence the first eight contact terminals 13. The corresponding eight first contact terminals are assembled, for example welded or soldered, in each contact pin 21 and 22. Two rows each of 108 pins 21 or 22 are therefore found on the upper surface of the printing bar. For the same assembly 20, the two contact pins 21 and 22 will subsequently be electrically connected to each other (this connection not being shown) to constitute a first feed terminal for the plates of a same assembly (see FIG. 6).

The location of each contact terminal 14 is shown schematically by a short line. Eight second contact terminals 14, spaced out up the height of the plates and staggered across the width of the assembly 20 so as to make them as accessible as possible, are seen at each assembly 20 on a same lateral surface (the front surface of the printing bar). The eight second terminals 14 in question are divided into two groups of four terminals, the two groups being disposed in two parallel lines slightly inclined to the vertical; the four terminals of a same group are separated from one another by three plates and are therefore staggered substantially across the width of the assembly 20. This disposition of the terminals 14 is maintained from one assembly 20 to the other assemblies. Therefore, eight rows each of which comprises 108 second contact terminals 14 are found again on the front surface of the printing bar. The 108 contact terminals 14 of a same row are electrically connected by an electric conductor 24 welded or soldered on these 108 second contact terminals. This conductor 24 and the other identical conductors on the seven other rows of the front surface form a network of conductors which bring the eight rows of 108 terminals 14 up to the level of the upper surface of the printing bar: they form a row of eight pins 25 which constitute eight feed terminals 25 for the plates. The rear surface of the printing bar is identical to its front surface. There, a second network of conductors such as 24 constitutes another row of eight pins 26 at the other longitudinal edge of the upper surface of the printing bar. These pins 26 constitute eight other second feed terminals 26 for the plates. The second feed terminals 25 and 26 are carried by an extension or arm 27 of the insulative retaining plate 9. The ends of the conductors such as 24 are inserted in notches which are provided therein and pass through this arm 27. At the front surface and at the rear surface of the printing bar, insulative plates (not shown) cover and hold the conductors such as 24 and insulate them from one another.

The printing bar is completed by a printed circuit board 28 shown simply in FIG. 4. This printed circuit board 28 is situated on the upper surface of the printing bar and pins such as 21(22) and 25(26) which are connected to the stylus addressing control circuit pass therethrough. Advantageously, this addressing control circuit will be carried by this printed circuit board 28.

Figure 5:
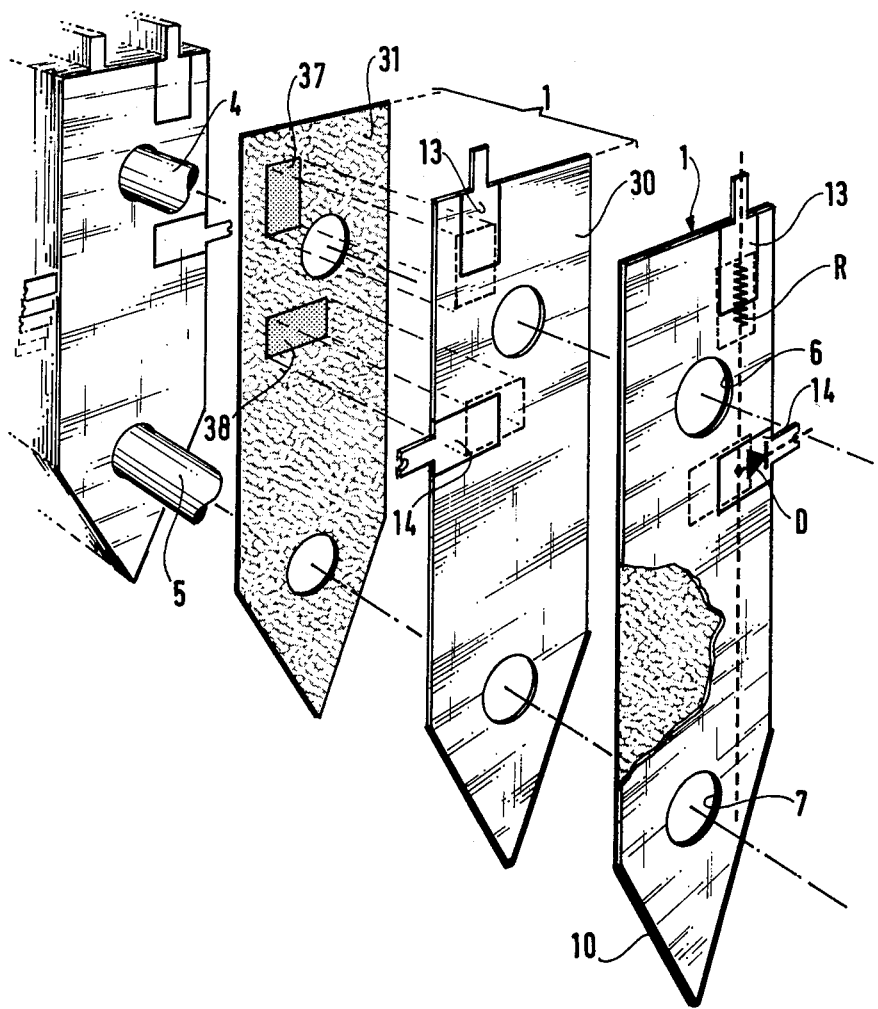
FIG. 5 shows an arrangement in accordance with a variant in relation to FIG. 1 of components of a printing bar in accordance with the invention.

FIG. 5 shows a variant of organisation of the components which form a printing bar. The organisation shown in FIG. 5 is explained by comparison with that shown in FIGS. 1 and 2 and hence the identical parts are identically referenced. The printing bar, only partially shown, is constituted by an alternate stack of conductive laminae 30 and of insulative laminae 31. A pair of laminae, i.e. a conductive lamina and an insulative lamina, constitute one of the plates 1 in the preceding figures which have a conductive surface and an insulative surface. Like each of the preceding plates, the conductive laminae 30 each have two cut-outs (such as 11 and 12 in FIG. 2) in which are respectively inserted a first contact terminal and a second contact terminal also previously referenced 13 and 14.

The first contact terminals 13 are alternately disposed on either side of the centre plane of this printing bar. The second contact terminals 14 are alternately situated on one or other of the front and rear surfaces of the printing bar; two consecutive terminals of a single surface are staggered in relation to each other in the same way as described previously. These contact terminals 13 and 14 are made of a metal which is a good electric conductor and are insulated from the conductive laminae which carry them.

The insulative lamina 31 of each pair of laminae 30-31 or of each plate 1 is covered by a layer of resistive material 37, for example a carbon deposit, facing the conductive lamina and the first contact terminal 13. This insulative lamina is also covered by a layer or pellet of semiconductive material 38 facing the conductive lamina and the second conductive terminal 14. These layers 37 and 38 overlap on the surface of the conductive lamina and the corresponding contact terminal (13 respectively 14) when the laminae 30 and 31 are stacked. These places are schematically shown by the rectangles in broken lines inside which an electrical resistance R and a diode D thus formed are schematically shown. In this FIG. 5, the broken line also shows the resulting electric circuit. It is seen that the end stylus 10 of a lamina 30 (or plate 1) is fed via the resistor R from the first contact terminal 13 inserted in this lamina and has a diode D which makes it possible or impossible to short-circuit the stylus from the second contact terminal 14 which is also inserted in the lamina in question.

In a variant which is not shown, which corresponds to the same electric circuit, the resistive and semiconductive deposits can be made on the conductive lamina, respectively at the places indicated by the broken-line rectangles in FIG. 5.

Figure 6:
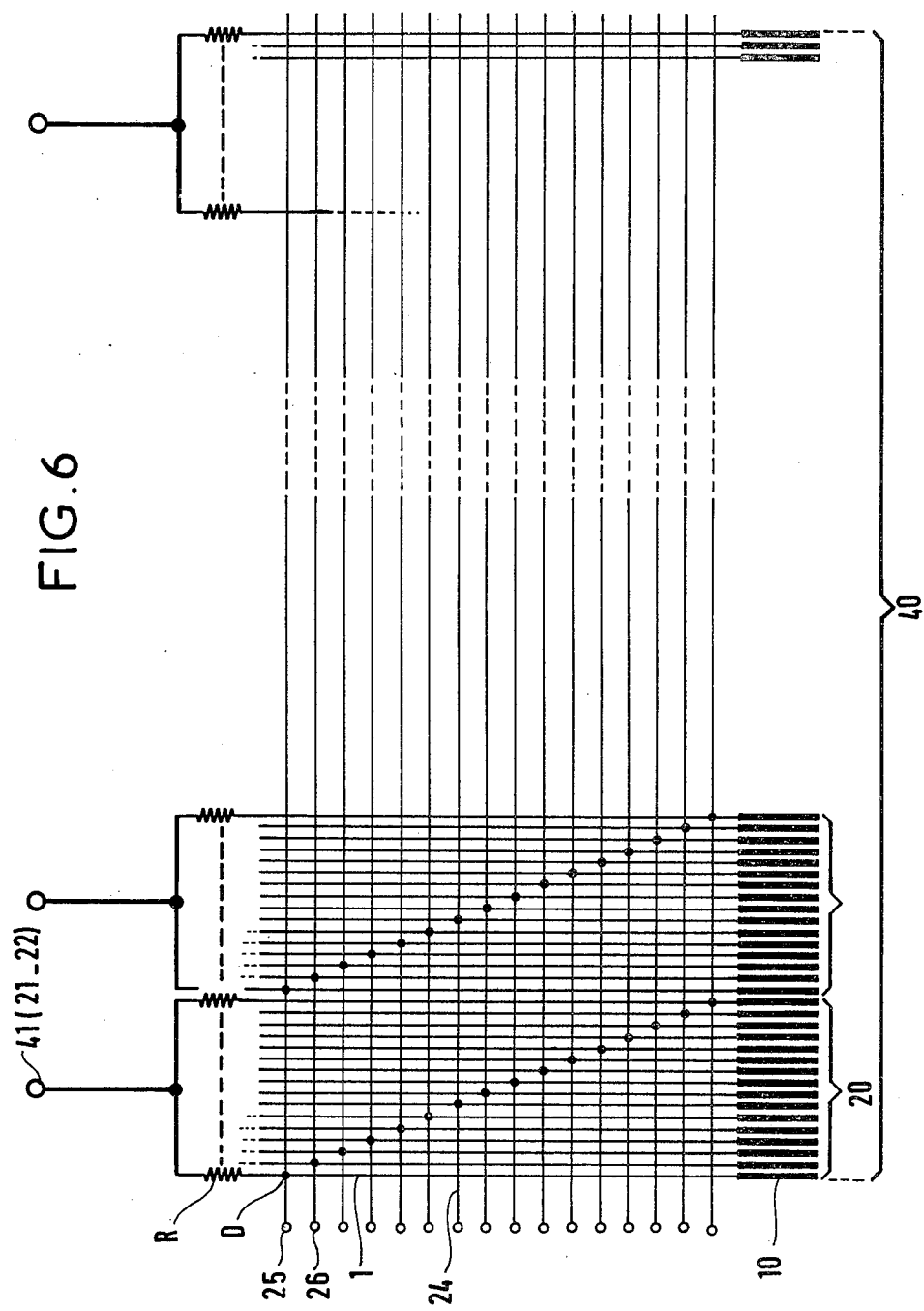
FIG. 6 shows the circuit diagram of the printing bar in accordance with the invention.

FIG. 6 shows the circuit diagram of a printing bar in accordance with the examples described, including the stylus 10 addressing circuit. The stylus 10 addressing circuit of the complete printing bar indicated by a bracket 40 consitutes 108 diagonal diode D matrices each designated by the reference 20 which is assigned to each assembly of sixteen plates 1.

In each diagonal matrix, the sixteen columns are constituted by the conductive plates 1 (conductive surface of the plate or conductive lamina 30). The sixteen columns 1 are connected to a first feed terminal 41 formed by the connection of the two pins 21 and 22 (FIG. 3), and via sixteen respective resistances R. The feed terminals such as the terminals 41 are independent from one matrix 20 to another.

In each diagonal matrix, the sixteen rows are constituted by two groups of eight conductors 24 of the front and rear surfaces of the printing bar, each conductor 24 being connected to one of the sixteen diodes D, here shown by a dot, and to the corresponding second feed terminal 25 or 26. The terminals 25 and 26 are independent. In accordance with the organisation previously described, they are alternate; in FIG. 6, the normal order of the rows has been re-established. These sixteen rows 24 of a matrix 20 are common to the 108 matrices of the printing bar. They connect the diodes which are associated with the plates of same order belonging to the 108 matrices.

By way of example, it is stated that the voltage applied to one of the terminals 41 will be 0 or 5 volts; that applied to one of the terminals 25 or 26 will be 0 or 5 volts. Since the first stylus of the first matrix 20 must be controlled for a black dot to be printed, a potential of 5 volts will be applied to the terminal 41 of this first matrix as well as to the terminal 25 connected to the first line. A potential of 0 volts will be applied to the other terminals such as 41 which feed the columns of the other matrices as wel as to the terminals 25 and 26 connected to the fifteen other rows. At this first matrix, a potential of 5 volts is applied by the terminal 41 to the sixteen columns. However, only the diode D to which a potential of 5 volts is applied will be blocked and will prevent current from passing through the diode: the first stylus is therefore fed and the current in this stylus causes a black dot to be printed. The fifteen other diodes of this first matrix which are fed with 0 volts are conductive: the residual current in these fifteen styli which is due to the saturation voltage of the diodes is quite insufficient to cause any printing. At the other matrices, all the diodes disposed on the first row in question are fed with a potential of 5 volts. However, this remains without effect since the columns of the other matrices are at 0 volts; the styli of the other matrices are not fed. The diodes make it possible or impossible to short-circuit the styli of a single matrix, independently from one another. The diodes also make it possible to select a single matrix among the 108 existing matrices.

Figure 7:
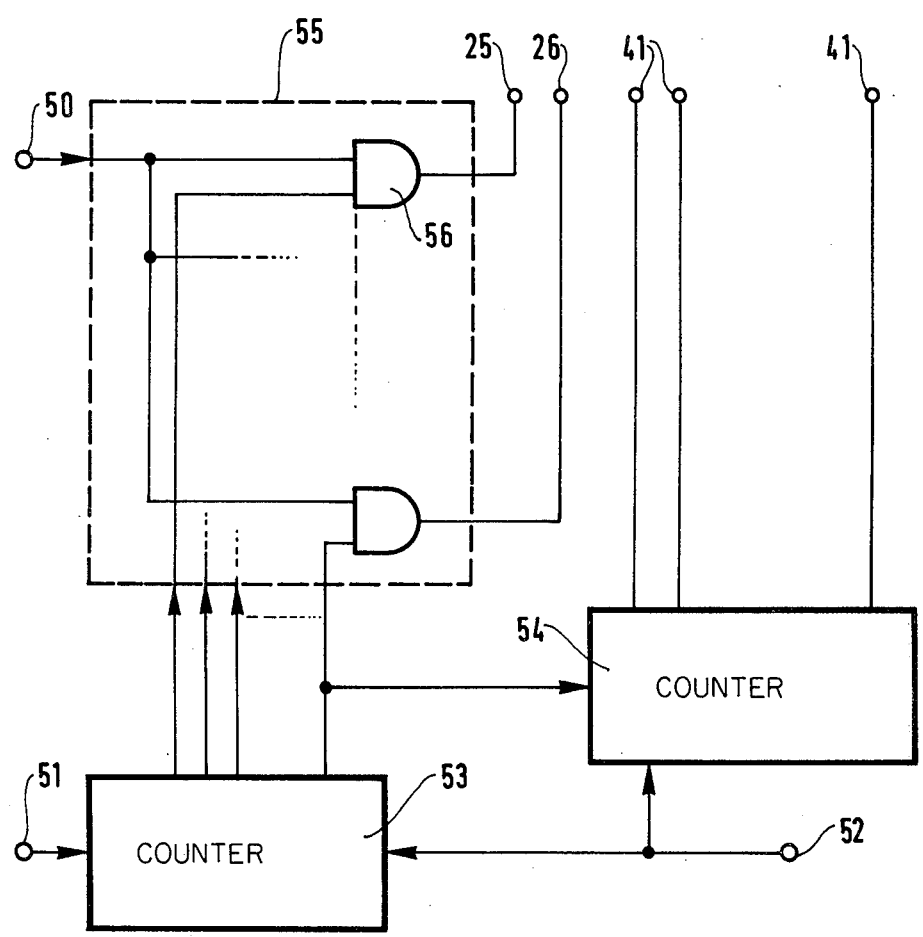
FIG. 7 shows an embodiment of the printing bar control circuit.

FIG. 7 shows schematically an embodiment of an addressing circuit control circuit. This control circuit can be carried by the printed circuit board 28 shown in FIG. 4.

This control circuit has been shown with two control inputs. One of the inputs 50 receives the data signal for printing a line, this signal is composed of pulses with a logic level 0 (0 volts) for printing a white dot (stylus addressed but not controlled) or with a logic level 1 (5 volts) for printing a black dot (stylus addressed and controlled, i.e. a current passes through it). The input 51 receives clock pulses at the rate of the printing of the dots along a scan line of the paper. The data signal and the clock signal are synchronous. A third input of the circuit 52 receives the signal for synchronizing the beginning of a scan line.

The control circuit of the 108 matrices 20 includes a modulo 16, counter 53 connected to the input 51 which receives the clock signal. A modulo 108 counter 54 is connected to the output of the order 16 of the counter 53. It has 108 outputs connected respectively to the first 108 feed terminals 41 of the 108 matrices to allow them to be fed successively.

The sixteen outputs of the counter 53 are connected to a combinative logic circuit 55 which receives the data signal from the input 50. This logic circuit 55 includes 16 AND gates such as 56 which receive firstly in parallel the data signal coming from the input 50 and then connected respectively to the sixteen outputs of the counter 53. The outputs of the sixteen AND gates 56 are connected respectively to the sixteen second feed terminals 25, 26 of the 108 stylus addressing matrices.

During operation, the beginning of line synchronization signal forces the modulo 108 counter 54 into the state 1, for example on detecting the end of this signal. A potential of 5 volts is applied to the sixteen columns of the first matrix 20. This same signal coming from the terminal 52 forces the modulo 16 counter 53 into the state zero. The clock pulses which follow this line synchronization signal make the state of the counter progress by 16 to control the AND gates 56 which are therefore successively conductive for the data signal. For the state 1 of the counter 53, since the corresponding pulse of the data signal is at the level 1 (black dot) the first row of the 108 matrices will be fed at a potential of 5 volts, the other rows being at 0 volts. The first stylus writes a black dot. For this same state of the counter 53, since the corresponding pulse of the data signal is at the level 0 (white dot), the first line and the other lines of the matrices are at 0 volts; the first stylus writes nothing (the appearance of the paper at this point is kept white). The styli are thus successively addressed and fed.

The present invention has been described with reference to particular examples in the figures and with reference to a particular application for printing on a paper which originally has a light appearance. It is evident that these examples cannot limit the scope of the invention.

It is also evident that the modes of organization of the plates illustrated and described have been chosen by way of examples and that without going beyond the scope of the invention any details cna be modified which make it possible to perform the required functions.

We claim:

1. A bar for printing an image on sensitive paper by scanning said paper along successive lines, comprising a stack of thin, electrically-conductive plates which are insulated one from the other, each of said plates having a first end which comprises a printing stylus, said printing styli being disposed along a scan line at the pitch of the printing dots there along, and n diagonal diode matrices for addressing said styli, the columns of said plates which are divided into n sets corresponding to the n matrices, the rows of said matrices being common to all n matrices and comprising at least one network of electrical conductors, and wherein in each of said n matrices:

the columns of said matrix are connected to and fed by a first feed terminal via a corresponding plurality of resistances (R), one first feed terminal being associated with each of said n matrices;

each of said resistances (R) comprises a thin leaf of resistive material in substantially intimate, co-planar electrical contact with one of said plates and with a first contact terminal inserted in this plate or in an adjacent plate, said first contact terminal being insulated from the plate into which it is inserted and being electrically connected to said first feed terminal;

the rows of said matrix are connected to said plates via a corresponding plurality of electrical diodes (D) individually controlled from a plurality of second feed terminals equal in number to the number of rows in said matrix; and each of said diodes (D) comprises a thin leaf of semi-conductive material in substantially intimate, co-planar electrical contact with one of said plates and with a second contact terminal inserted in this plate or in an adjacent plate, said second contact terminal being insulated from the plate in which it is inserted and being electrically connected to one of the conductors in said network of conductors.

2. A printing bar according to claim 1, wherein each first contact terminal is inserted in a second end of the plate.

3. A printing bar according to claim 2, wherein at each addressing diode matrix, said first contact terminals are disposed alternately on either side of the transversal centre plane of the plates which belong to the matrix in question, the first contact terminals which are situated on a same side of said transversal centre plane being connected together and forming a connection pin, the two connecting pins on either side of said centre plane being connected to said first feed terminal of the matrix in question.

4. A printing bar according to claim 1 or 2 or 3 wherein each of said second contact terminals (14) is inserted in a side of a plate.

5. A printing bar according to claim 4, wherein said second contact terminals are inserted in alternate sides of the plates.

6. A printing bar according to claim 5, wherein in each matrix, the second contact terminals which are inserted in the same side of a plate are staggered along the height of the plate.

7. A printing bar according to claim 6, wherein the second terminals on the same side of a plate are divided in two groups of four second terminals, the four terminals of each group being staggered substantially across the width of the assembly of plates in question and being substantially aligned with a small inclination with respect to the columns of the matrix in question.

8. A printing bar according to claim 1, or 2, or 3 comprising 1728 plates which form 1728 printing styli and wherein said plates are divided into 108 assemblies of 16 plates each.

9. A printing bar according to claim 1, or 2, or 3 wherein said plates are covered with or formed by an electrically conductive material which has catalytic properties.

10. A bar for printing an image on sensitive paper by scanning said paper along successive lines, comprising a stack of thin, electrically conductive plates which are insulated one from the other, each of said plates being made of a material which is a good electric conductor, having a surface which is covered with insulative material referred to as the insulative surface and having a first end which comprises a printing stylus, said printing styli being disposed along a scan line at the pitch of the printing dots therealong, and n diagonal diode matrices for addressing said styli, the columns of said matrices comprising corresponding ones of said plates which are divided into n sets corresponding to the n matrices, the rows of said matrices being common to all n matrices and comprising at least one network of electrical conductors, and wherein in each of said n matrices:

the columns of said matrix are connected to and fed by a first feed terminal via a corresponding plurality of resistances (R), one first feed terminal being associated with each of said n matrices;

each of said resistances (R) comprises a thin leaf of resistive material in substantially intimate, co-planar electrical contact with one of said plates and with a first contact terminal inserted in an adjacent plate, said first contact terminal being insulated from the plate into which it is inserted and being electrically connected to said first feed terminal, and said thin leaf of resistive material being carried by the surface of said first contact terminal which is situated on the same side as the insulative surface of the plate in which said first contact terminal is inserted;

the rows of said matrix are connected to said plates via a corresponding plurality of electrical diodes (D) individually controlled from a plurality of second feed terminals equal in number to the number of rows in said matrix; and each of said diodes (D) comprises a thin leaf of semi-conductive material in substantially intimate, co-planar electrical contact with one of said plates and with a second contact terminal inserted in an adjacent plate, said second contact terminal being insulated from the plate in which it is inserted and being electrically connected to one of the conductors in said network of conductors, and said thin leaf of semi-conductive material being carried by the surface of said second contact terminal which is situated on the same side as the insulative surface of the plate in which said second contact terminal is inserted.

11. A bar for printing an image on sensitive paper by scanning said paper along successive lines, comprising a stack of thin, electrically-conductive plates which are insulated one from the other, each of said plates comprising a conductive lamina and an insulative lamina and having a first end which comprises a printing stylus, said printing styli being disposed along a scan line at the pitch of the printing dots therealong, and n diagonal diode matrices for addressing said styli, the columns of said matrices comprising corresponding ones of said plates which are divided into n sets corresponding to the n matrices, the rows of said matrices being common to all n matrices and comprising at least one network of electrical conductors, and wherein in each of said n matrices:

the columns of said matrix are connected to and fed by a first feed terminal via a corresponding plurality of resistances (R), one first feed terminal being associated with each of said n matrices;

each of said resistances (R) comprises a thin leaf of resistive material in substantially intimate, co-planar electrical contact with one of said plates and with a first contact terminal inserted in this plate, said first contact terminal being carried by and insulated from the conductive lamina of the plate into which it is inserted and being electrically connected to said first feed terminal, and said thin leaf of resistive material being carried by the insulative lamina of the plate into which said first contact terminal is inserted and being positioned to overlap said first contact terminal and the conductive lamina of this plate;

the rows of said matrix are connected to said plates via a corresponding plurality of electrical diodes (D) individually controlled from a plurality of second feed terminals equal in number to the number of rows in said matrix; and each of said diodes (D) comprises a thin leaf of semi-conductive material in substantially intimate, co-planar electrical contact with one of said plates and with a second contact terminal inserted in this plate, said second contact terminal being carried by and insulated from the conductive lamina of the plate in which it is inserted and being electrically connected to one of the conductors in said network of conductors, and said thin leaf of semi-conductive material being carried by the insulative lamina of the plate into which said second contact terminal is inserted and being positioned to overlap said second contact terminal and the conductive lamina of this plate.

12. A bar for printing an image on sensitive paper by scanning said paper along successive lines, comprising a stack of thin, electrically, conductive plates which are insulated one from the other, each of said plates comprising a conductive lamina (30) and an insulative lamina and having a first end which comprises a printing stylus, said printing styli being disposed along a scan line at the pitch of the printing dots therealong, and n diagonal diode matrices for addressing said styli, the columns of said matrices comprising corresponding ones of said plates which are divided into n sets corresponding to the n matrices, the rows of said matrices being common to all n matrices and comprising at least one network of electrical conductors, and wherein in each of said n matrices:

the columns of said matrix are connected to and fed by a first feed terminal via a corresponding plurality of resistances (R), one first feed terminal being associated with each of said n matrices;

each of said resistances (R) comprises a thin leaf of resistive material in substantially intimate, co-planar electrical contact with one of said plates and with a first contact terminal inserted in this plate, said first contact terminal being carried by and insulated from the conductive lamina of the plate into which it is inserted and being electrically connected to said first feed terminal, and said thin leaf of resistive material being also carried by this conductive lamina and overlapping said first contact terminal the rows of said matrix are connected to said plates via a corresponding plurality of electrical diodes (D) individually controlled from a plurality of second feed terminals equal in number to the number of rows in said matrix; and each of said diodes (D) comprises a thin leaf of semiconductive material in substantially intimate, coplanar electrical contact with one of said plates and with a second contact terminal inserted in this plate, said second contact terminal being carried by and insulated from the conductive lamina of the plate in which it is inserted and being electrically connected to one of the conductors in said network of conductors, and said thin leaf of semi-conductive material being also carried by this conductive lamina and overlapping said second contact terminal.

13. A bar for printing an image on sensitive paper comprising
(a) a plurality of electrically conductive plates, stacked adjacent to one another and having styli at one end;
(b) a plurality of thin electrical insulators between said plates for insulating one plate from the adjacent plate;
(c) first and second conducting means on each of said plates, spaced apart from each other, and insulated from their bearing plate, for making contact to an external stylus-drive-circuit;
(d) a thin leaf of resistive material coplanar with said plates positioned adjacent to and in electrical contact with, at least part of both (i) said first conducting means and (ii) the plate carrying said first means or the adjacent plate; and
(e) a thin leaf of semiconductive material for forming a diode coplanar with said plates, positioned adjacent and in electrical contact with at least part of both (i) said second conducting means and (ii) the plate carrying said second means or the adjacent plate.

14. A bar for printing an image on sensitive paper by scanning the paper along successive lines, the bar comprising many printing styli (10) disposed along a scan line at the pitch of printing dots therealong, and comprising n diagonal diode matrices (20) for addressing the styli (10), the columns of the matrices being divided into n identical sets, being coupled to respective ones of the styli (10) and being fed via resistors (R) from first supply terminals (41), which are respectively connected to n matrices, the lines of the matrices being common to all n matrices and being each connected respectively to the columns via a diode (D) and being fed respectively from second supply terminals (25,26) which are respectively connected to the lines, characterized by the fact that the bar consists of a stack of thin conductive plates (1), which are insulated from each other and each of which includes a first end that constitutes one of the printing styli, the stack including the resistors (R) and the diodes (D) of the n matrices, and characterized in that the plates arranged in n sets build up the columns of n matrices and comprise each a first contact terminal (13), which is inserted at a second end essentially opposed to said first end into the respective plate, the contact terminal being insulated from said plate and being electrically connected together with the first contact terminals of the other plates of this set to the first supply terminal (41), which is assigned to the corresponding matrix, and comprise each a second contact terminal (14) inserted lateraly in the respective plate, the terminal being electrically insulated from this plate and being electrically connected by a conductor (24), which constitutes one of the matrix lines, to the second contact terminal of plates of equal rank within the n sets and to the second supply terminal (25,26) assigned to that line, and characterized by the fact that each resistor (R) is formed by a film of resistive material (37,17) in electric contact firstly with one of the plates (1) and secondly with the first contact terminal (13) of the said one of the plates or the adjacent plate, and characterized in that each diode (D) is formed by a film of semiconductive material (38,18) in electric contact firstly with one of the plates (1) and secondly with the second contact terminal (14) inserted in the said one of the plates or the adjacent plate.

* * * * *